US008769816B2

(12) United States Patent
Beeck

(10) Patent No.: US 8,769,816 B2
(45) Date of Patent: Jul. 8, 2014

(54) METHOD OF ASSEMBLING A GAS TURBINE ENGINE

(75) Inventor: Alexander R. Beeck, Orlando, FL (US)

(73) Assignee: Siemens Aktiengesellschaft, Mäunchen (DE)

(*) Notice: Subject to any disclaimer, the term of this patent is extended or adjusted under 35 U.S.C. 154(b) by 115 days.

(21) Appl. No.: 13/367,750

(22) Filed: Feb. 7, 2012

(65) Prior Publication Data
US 2013/0199038 A1 Aug. 8, 2013

(51) Int. Cl.
B23P 11/00 (2006.01)

(52) U.S. Cl.
USPC ........................ 29/889.2; 29/889.22

(58) Field of Classification Search
USPC ........................................ 415/174.5
See application file for complete search history.

(56) References Cited

U.S. PATENT DOCUMENTS

| 2,848,156 | A | | 8/1958 | Oppenheimer |
| 4,019,320 | A | | 4/1977 | Redinger, Jr. et al. |
| 4,314,793 | A | | 2/1982 | DeTolla et al. |
| 4,426,191 | A | | 1/1984 | Brodell et al. |
| 5,127,799 | A | * | 7/1992 | Berry ..................... 415/170.1 |
| 5,263,816 | A | | 11/1993 | Weimer et al. |
| 5,267,397 | A | | 12/1993 | Wilcox |
| 6,725,542 | B1 | | 4/2004 | Maguire |
| 6,761,530 | B1 | | 7/2004 | Ginessin et al. |
| 7,234,918 | B2 | * | 6/2007 | Brillert et al. ............... 415/173.5 |
| 7,249,928 | B2 | | 7/2007 | Klasing et al. |
| 7,341,426 | B2 | | 3/2008 | Schwarz et al. |
| 7,661,260 | B2 | | 2/2010 | Moniz et al. |
| 7,824,151 | B2 | | 11/2010 | Schwarz et al. |
| 7,869,979 | B2 | | 1/2011 | Pfeifer et al. |
| 8,016,553 | B1 | | 9/2011 | Liang |
| 2009/0014964 | A1 | | 1/2009 | Pu et al. |
| 2011/0005054 | A1 | * | 1/2011 | Maurell et al. ................. 29/428 |

FOREIGN PATENT DOCUMENTS

SU 542009 A * 3/1977 ............... F01D 9/02

* cited by examiner

Primary Examiner — Alexander P Taousakis
Assistant Examiner — Matthew P Travers

(57) ABSTRACT

A method of assembling a seal in a horizontal split plane gas turbine engine including providing a rotor assembly including a turbine blade assembly defining a forward face and a seal ring extending axially from the forward face. The rotor assembly is positioned extending through a lower compressor casing and a lower turbine casing, the positioning including tilting the rotor assembly at an angle relative to the longitudinal axis for the engine. An upper turbine casing is positioned over the tilted rotor assembly, and the upper and lower turbine casings define a circumferentially extending seal groove. The rotor assembly is moved in an axially forward direction to position the seal ring in axially overlapping relation within the seal groove. The longitudinal axis of the rotor assembly is then aligned with the longitudinal axis of the turbine engine to further position the seal ring within the seal groove.

12 Claims, 6 Drawing Sheets

METHOD OF ASSEMBLING A GAS TURBINE ENGINE

FIELD OF THE INVENTION

The present invention relates to axial flow machines and, more particularly, to gas turbine engines and a method of assembling a rotor assembly into a gas turbine engine to improve sealing between radially inner rotating and non-rotating components.

BACKGROUND OF THE INVENTION

Referring to FIG. 8, an example of typical industrial gas turbine engine 10 is illustrated and generally includes a compressor section 12, a combustor section 14, a turbine section 16 and an exhaust section 18. The compressor section 12 includes alternating stationary and rotating components comprising stationary vanes 20 supported to an outer compressor casing 24, and rotating blades 22 supported to a rotor assembly 26 that extends up to a location in or adjacent to the exhaust section 18 where the rear end of the rotor assembly 26 may be supported at a rear bearing 19 positioned in a rear bearing housing 21. Also, the turbine section 16 includes alternating stationary and rotating components comprising stationary vanes 28 supported to an outer turbine casing 32 and rotating blades 30 supported to the rotor assembly 26. Typically, the outer compressor casing 24 may include vane carrier structure 34 supporting the stationary vanes 20, and the outer turbine casing 32 may include vane carrier structure 36 for supporting the stationary vanes 28.

The turbine engine 10 is shown as being formed as a horizontal split plane assembly. That is, the compressor casing 24 is formed of an upper half 24a and a lower half 24b that may be joined at horizontal joints defined by respective axially extending flanges 38a, 38b. Similarly, the turbine casing 32 is formed of an upper half 32a and a lower half 32b that may be joined at horizontal joints defined by respective axially extending flanges 40a, 40b. Industrial gas turbine engines are commonly formed of relatively large components, and the horizontal split plane configuration, such as is illustrated in FIG. 8, facilitates assembly, wherein the stationary components of the lower half of the engine may be assembled, the assembled rotor assembly 26 may be placed into the lower half, and the assembled upper half may be positioned on the lower half to form an axial flow path through the engine. Assembly of the rotor assembly 26 into the lower half and positioning of the upper half into association with the lower half also comprises positioning of the outer tips of the blades 20, 30 in close association with stationary seal rings 42, 44 supported to the compressor and turbine casings 24, 32, respectively, and axially positioned between vane platforms to limit axial passage of air and hot gas flows past the rotating blade tips.

The compressor section 12 can induct ambient air and can compress it. The compressed air from the compressor section 12 can enter one or more combustors 20 in the combustor section 14. The compressed air can be mixed with fuel, and the air-fuel mixture can be burned in the combustors 20 to form a hot working gas. The hot gas is routed to the turbine section 16 where it is expanded through the alternating rows of stationary vanes 28 and rotating blades 30 and used to generate power that can drive the rotor assembly 26. The expanded gas exiting the turbine section 16 can be exhausted from the engine 10 via the exhaust section 18.

Leakage between the hot gas in the hot gas flow path and a supply of cooling fluid, such as cooling air in air cavities 46 located radially inwardly from the vanes 28 and blades 30, i.e., rim or vane cavities, reduces engine performance and efficiency. Cooling air leakage from the cavities into the hot gas flow path can disrupt the flow of the hot gases and increase heat losses. Additionally, hot gas leakage into the rim/vane cavities may yield higher vane and vane platform temperatures and may result in reduced performance, and may further result in increased thermally induced deterioration of components.

SUMMARY OF THE INVENTION

In accordance with an aspect of the invention, a method of assembling a seal in a split plane gas turbine engine is provided. The turbine gas engine includes a compressor section, a turbine section and a rotor assembly extending through the compressor section and the turbine section. The rotor assembly supports a compressor blade assembly and a turbine blade assembly, and the engine further includes a lower compressor casing and a lower turbine casing axially aligned along a longitudinal axis of the turbine engine. The method comprises:

i) providing a seal ring extending axially from a forward face of the turbine blade assembly;

ii) positioning the rotor assembly in association with the lower compressor casing and the lower turbine casing, the positioning including tilting the rotor assembly at an angle relative to the longitudinal axis;

iii) positioning an upper turbine casing over the tilted rotor assembly in engagement with the lower turbine casing, the lower turbine casing and the upper turbine casing including a circumferentially extending seal groove defining an axially facing cavity for receiving the seal ring, and the seal ring having an initial non-overlapping position in relation to the seal groove;

iv) moving the rotor assembly in an axial direction toward the compressor section to position the seal ring in axially overlapping relation within the seal groove; and v) positioning the rotor assembly such that a longitudinal axis of the rotor assembly coincides with the longitudinal axis of the turbine engine, for effecting a further axial movement of an upper portion of the seal ring into the seal groove via another tilting of the rotor assembly.

In accordance with further aspects of the invention, the tilting of the rotor assembly during the positioning of step ii) may comprise orienting the rotor assembly such the compressor blade assembly is at an elevated position relative to the turbine blade assembly. The tilting of the rotor assembly may comprise orienting a longitudinal axis of the rotor assembly at an angle greater than 0 degrees and less than 1 degree relative to the longitudinal axis of the turbine engine.

The rotor assembly may include a front bearing adjacent to the compressor blade assembly and a rear bearing adjacent to the turbine blade assembly. In accordance with an aspect of the invention, the positioning the rotor assembly may comprise the sequence of: 1) lowering the rotor assembly to position the compressor blade assembly and the turbine blade assembly at a location adjacent to the lower compressor casing and the turbine casing, respectively; and 2) lowering the rear bearing to position the rear bearing at a lower elevation than the front bearing. In accordance with an alternative aspect of the invention, the positioning the rotor assembly may comprise in sequence: 1) orienting the longitudinal axis of the rotor assembly at an angle relative to the longitudinal axis of the turbine engine with the rear bearing at a lower elevation than the front bearing; and 2) lowering the tilted rotor assembly toward the lower compressor and turbine casings.

Subsequent to positioning the longitudinal axis of the rotor assembly to coincide with the longitudinal axis of the turbine engine, an upper compressor casing may be positioned over the compressor blade assembly and engaged with the lower compressor casing. The rotor assembly may be moved axially an additional amount in the direction of the compressor section with the longitudinal axis of the rotor assembly coinciding with the longitudinal axis of the turbine engine, and the moving of the rotor assembly an additional amount may occur during operation of the turbine engine.

In accordance with another aspect of the invention, a method of assembling a seal in a split plane gas turbine engine is provided. The turbine gas engine includes a compressor section, a turbine section and a rotor assembly extending through the compressor section and the turbine section. The rotor assembly supports a compressor blade assembly and a turbine blade assembly, and the engine further includes a lower compressor casing and a lower turbine casing axially aligned along a longitudinal axis of the turbine engine. The method comprising:

i) providing a seal ring extending axially from a forward face of the turbine blade assembly;

ii) positioning the rotor assembly in association with the lower compressor casing and the lower turbine casing;

iii) positioning an upper turbine casing in engagement with the lower turbine casing, the lower turbine casing and the upper turbine casing including a circumferentially extending seal groove defining an axially facing cavity for receiving the seal ring, and the seal ring having an initial non-overlapping position in relation to the seal groove; and iv) moving the rotor assembly in an axial direction a first amount toward the compressor section to position the seal ring in axially overlapping relation within the seal groove.

The rotor assembly may be moved axially a second amount in the direction of the compressor with a longitudinal axis of the rotor assembly coinciding with the longitudinal axis of the turbine engine. Prior to moving the rotor assembly the second amount, an upper compressor casing may be positioned over the compressor blade assembly and engaged with the lower compressor casing. Further, the moving of the rotor assembly the second amount may occur during operation of the turbine engine.

Additionally, prior to moving the rotor assembly the first amount, the rotor assembly may be tilted relative to the longitudinal axis of the turbine engine to orient the rotor assembly such that the compressor blade assembly is at an elevated position relative to the turbine blade assembly.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 8:
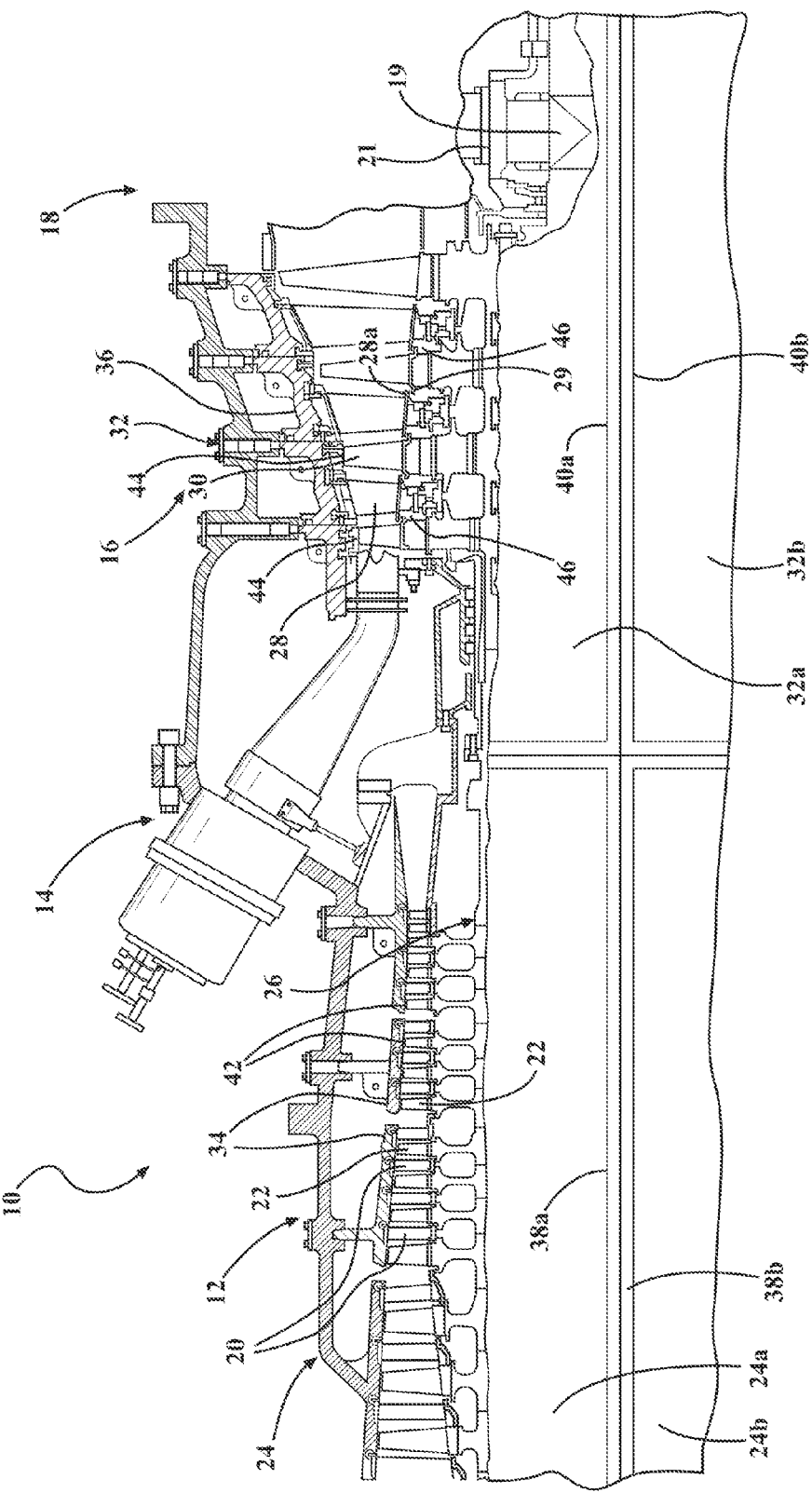
FIG. 8 is a partial cross-sectional view of a prior art gas turbine engine.

In accordance with aspects of the present invention, a seal configuration for reducing leakage flows between the hot gas path of a gas turbine engine, assembled as a horizontal split plane engine, is provided including a method for assembling the seal configuration in such a horizontal split plane engine. As noted above, a horizontal split plane engine facilitates assembly of large, and typically substantially heavy, gas turbine engine components, such as are used in large industrial gas turbine engines. As a consequence, the seal structure provided adjacent to the radially inner endwalls of a blade and an adjacent vane is typically limited to a structure in which an axially extending sealing flange or arm associated with the vane is positioned over an arm, such as an angel wing associated with the blade, i.e., an angel wing formed as an axial extension of a rotor disk supporting the blade. Such structure may be seen, for example, in FIG. 8 at the radial extension 28a of the vane 28 positioned over the angel wing 29 associated with the blade 30 in the turbine section 16. Hence, sealing by means of an interfitting or overlapping seal, where a sealing element of one of the components is located between radially spaced surfaces of the sealing element of the adjacent component is substantially prevented by the known or conventional assembly methods of horizontal split plane engines which utilize vertical or radial movement of the components into association with one another.

FIGS. 1-6 illustrate an assembly method for providing an interfitting or overlapping seal, hereinafter referred to as an overlapping seal, where the steps of the method are illustrated by a diagrammatical representation of pertinent components of a horizontal split plane engine 110. An example of an overlapping seal 108 that may be provided by the present method of assembly for the engine 110 is shown in FIG. 7. The overlapping seal 108 may comprise a stationary seal component 150 associated with a vane endwall 152 located at a radially inward end of a row of vanes 128. The stationary seal component 150 may include an axially extending radially inner flange 154 and an axially extending radially outer flange 156. The inner and outer flanges 154, 156 extend circumferentially about a central longitudinal axis $A_E$ of the engine 110 (see FIG. 1) and define a circumferentially extending annular seal groove 158 comprising a cavity facing in an axially rearward or downstream direction.

The overlapping seal 108 additionally may comprise a moving or rotating seal component associated with a blade endwall 162 located at a radially inward end of a row of blades 130a, and formed as an axially extending seal ring 160. The seal ring 160 may extend from other structure associated with the row of blades 130a such as, for example, extending from a forward or upstream face 163 of a rotor disk 164 supporting the row of blades 130a. The row of blades 130a, blade endwall 162, and rotor disk 164 may be collectively referred to as a turbine blade assembly 130. In the assembled condition of the overlapping seal 108, the seal ring 160 is received in the axially facing cavity defined by the seal groove 158. As can be seen in FIG. 7, both the inner and outer flanges 154, 156 extend in axially overlapping relation over the seal ring 160. The overlapping relationship between the seal ring 160 and inner and outer flanges 154, 156 form a labyrinth path that increases a pressure differential across the seal 108, and therefore leakage flow across the seal 108 is reduced.

Figure 1:
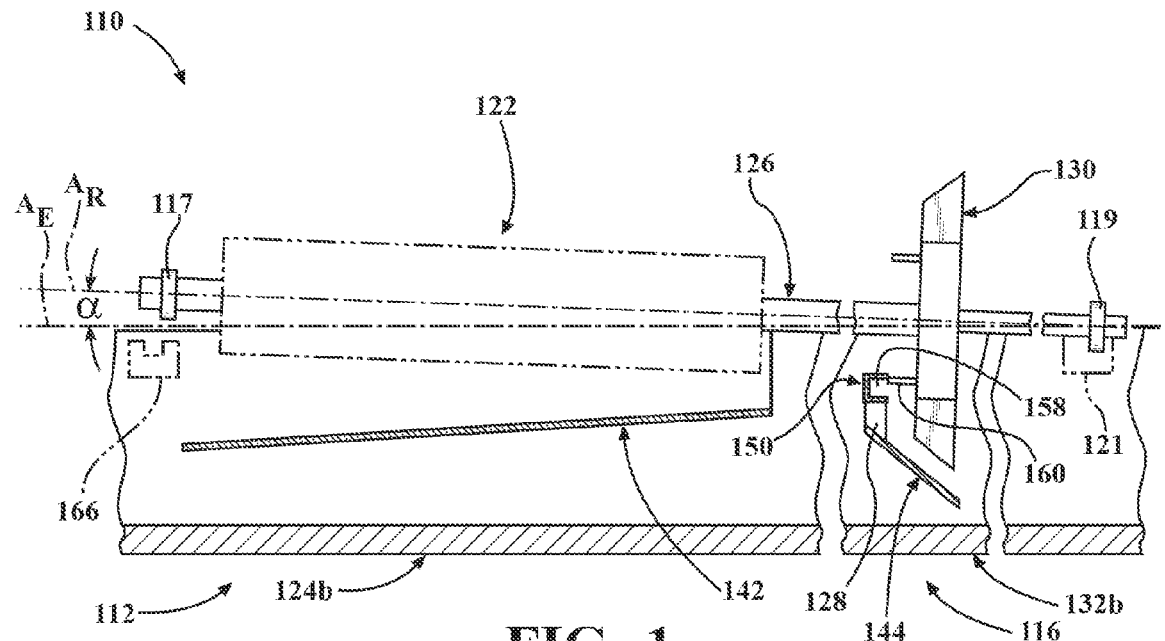
FIGS. 1-6 are diagrammatic illustrations showing a sequence of operations for assembling a horizontal split plane gas turbine engine including an overlapping seal in accordance with aspects of the present invention.

Referring to FIG. 1, the assembly method comprises providing a lower compressor casing 124b and a lower turbine casing 132b axially aligned along the longitudinal axis $A_E$ of the horizontal split plane turbine engine 110. The lower compressor casing 124b may include a vane carrier supporting outer ring segments, generally depicted by 142, and defining an outer portion of a compressor air flow path through a compressor section 112 for the engine 110. The lower turbine casing 132b may include a vane carrier supporting outer ring segments, generally depicted by 144, and defining an outer portion of a turbine hot gas flow path through a turbine section 116 for the engine 110.

A rotor assembly 126 is provided for extending through the compressor section 112 and the turbine section 116. The rotor assembly 126 includes or supports a compressor blade assembly, generally depicted by 122. It should be understood that the compressor blade assembly 122 may be formed by one or more rows of compressor blades axially separated by spaces for receiving compressor vanes therebetween in a manner similar to that illustrated in FIG. 8. The rotor assembly 126 further includes or supports a turbine blade assembly 130, such as is described above, and the turbine blade assembly 130 may comprise one or more rows of turbine blades 130a (FIG. 7) axially separated by spaces for receiving rows of turbine vanes 128 (FIG. 7) therebetween.

In an initial step of assembling the engine 110, the rotor assembly 126 is moved to position it in association with the lower compressor casing 124b and lower turbine casing 132b. The positioning of the rotor assembly 126 includes lowering it vertically, i.e., moving it radially, to position it in association with the lower casings 124b and 132b. The positioning of the rotor assembly 126 includes tilting the rotor assembly 126 such that a longitudinal axis $A_R$ of the rotor assembly 126 is angled in a vertical plane relative to the longitudinal axis $A_E$ of the engine 110. For example, the rotor assembly 126 may be lowered to a location where the longitudinal axis $A_R$ of the rotor assembly 126 is close to and slightly above the longitudinal axis $A_E$ of the engine 110. Subsequently, the front end of the rotor assembly 126 may be held stationary, such as at a front bearing 117, while the rear end of the rotor assembly 126, such as at a rear bearing 119, is lowered further to a location where a bottom-dead-center portion of the seal ring 160 is located at a position that is vertically between the inner and outer flanges 154, 156. In particular, the front bearing 117 may be held stationary at a predetermined position while the rear bearing 119 may be lowered to a location where it is supported to the lower turbine casing 132b by a rear bearing housing 121, as is illustrated in FIG. 1.

In the tilted position shown in FIG. 1, the center of the compressor blade assembly 122 is located at a higher elevation than the center of the turbine blade assembly 130, wherein an angle a is formed between the longitudinal axis $A_R$ of the rotor assembly 126 and the longitudinal axis $A_E$ of the engine 110. In accordance with an aspect of the invention, the angle a is greater than 0 degrees and less than 1 degree, and in a most preferred aspect the angle a may be much less than 1 degree and may be about 0.3 degrees. It should be noted that the diagrammatic illustrations presented herein provide an exaggerated depiction of the described angle to facilitate visualization of the method steps comprising the invention.

With the rotor assembly 126 located in the tilted position within the lower compressor and turbine casings 124b, 132b, an upper turbine casing 132a may be positioned over the tilted rotor assembly 126 and located in engagement with the lower turbine casing 132b to form an enclosed gas path at the turbine section 116. The annular seal groove 158 is defined by seal groove halves formed in the upper and lower turbine casings 132a, 132b, and comprising a continuous annular seal groove 158 when the casings 132a, 132b are joined together. When the upper turbine casing 132a is positioned in engagement with the lower turbine casing 132b, a top-dead-center portion of the seal ring 160 is located at a position that is vertically between the inner and outer flanges 154, 156. Further, it may be noted that in the position illustrated in FIG. 2, the seal ring 160 is located in substantially non-overlapping relation to at least the inner flange 154, and is in axially non-overlapping relation to the seal groove 158.

In a subsequent step of assembling the engine 110, the rotor assembly 126 is moved axially forward toward the compressor section 112. The axial movement of the rotor assembly 126 is represented by the distance $d_1$ in FIG. 3, where line $P_1$ represents an initial axial position of the rotor assembly 126, such as may correspond to an initial position of a location on the rotor assembly 126, and the line $P_2$ represents an axially displaced position of the location on the rotor assembly 126. The distance $d_1$ may be approximately 5-10 mm. The axial forward movement of the rotor assembly 126 positions the seal ring 160 in axially overlapping relation to the inner and outer flanges 154, 156, and thus locates the seal ring 160 in axially overlapping relation within the annular seal groove 158.

Figure 4:
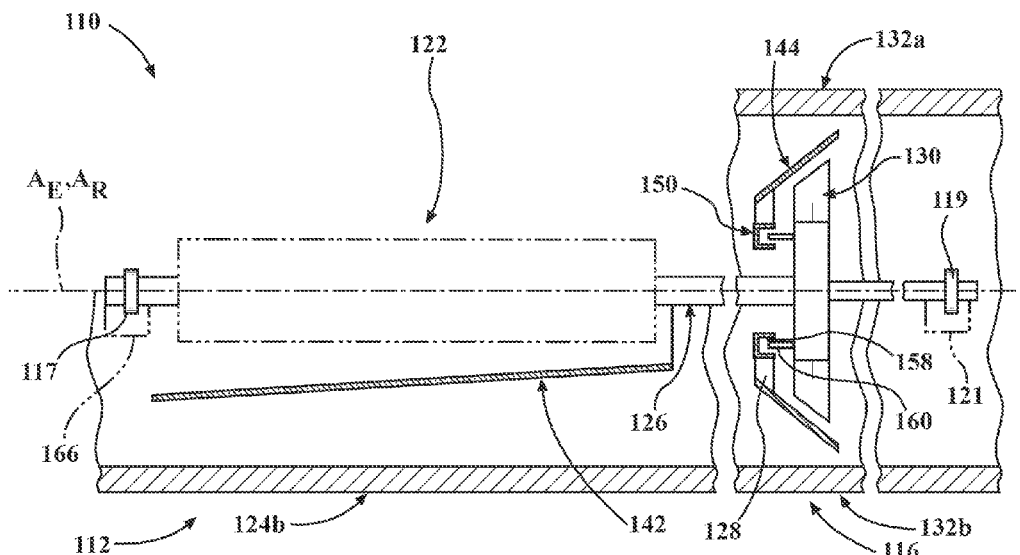

FIG. 4 illustrates a step of positioning the rotor assembly 126 such that the longitudinal axis $A_R$ of the rotor assembly is aligned with, i.e., collinear or coinciding with, the longitudinal axis $A_E$ of the engine 110. For example, the front bearing 117 may be lowered to a location where it is supported to the lower compressor casing 124b by a front bearing housing 166. The movement of the rotor assembly 126 from the tilted position to the aligned position comprises an axial movement of the upper portion of the seal ring 160 further into the upper portion of the seal groove 158 and an axial movement of the lower portion of the seal ring 160 partially out of the seal groove 158, such that the axial overlap of the seal ring 158 relative to the flanges 154, 156 is substantially equal around the circumference of the overlapping seal 108.

Figure 2:
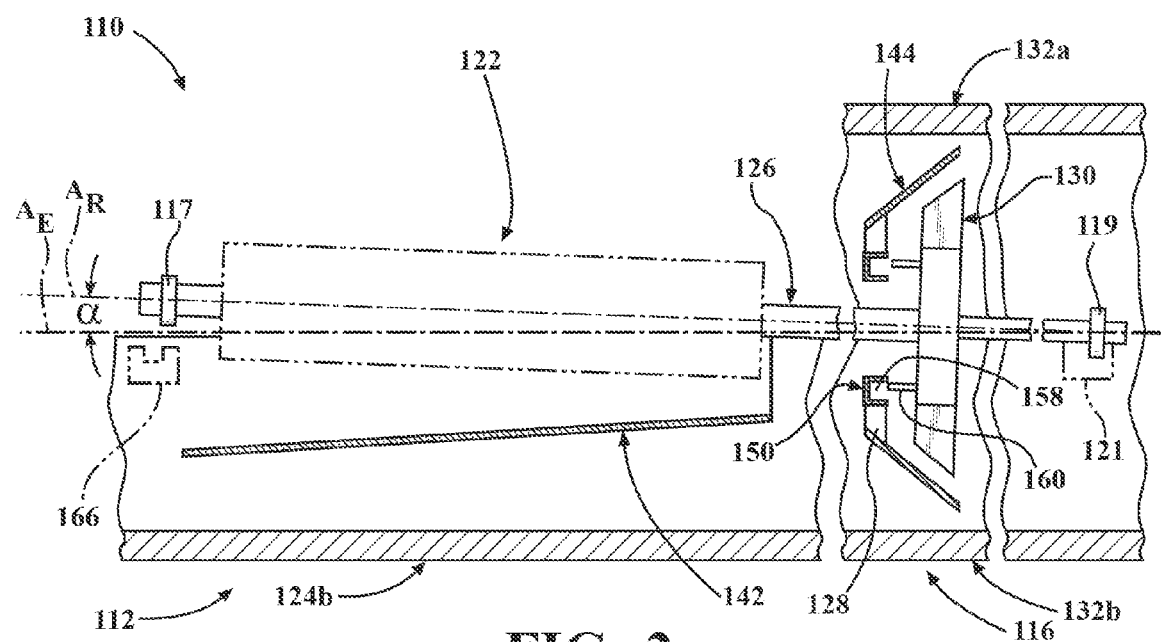

It should be understood that lowering the front of rotor assembly 126 from the tilted position to the position where it is aligned with the longitudinal axis $A_E$ of the engine 110 operates to locate the blade tips of the compressor blade assembly 122 in close association with the ring segments 142. It further may be noted that in the preceding steps, such as are illustrated in FIGS. 1-3, the tilting of the rotor assembly 126 operates to maintain an increased distance between the compressor blade assembly 122 and the ring segments 142, and thereby permits the rotor assembly 126 to be located at an axially rearward position, where the seal ring 160 may be axially clear of the end of the inner flange 154 during vertical or radial positioning of the rotor assembly 126 into the casings 124a, 132a. That is, the radial clearance between the blade tips of the compressor blade assembly 122 and the ring segments 142 could be too small to permit positioning of the rotor assembly 126 in the rearward position illustrated in FIG. 1, and tilting of the rotor assembly 126 increases the radial clearance sufficiently to enable axial movement of the rotor assembly 126 without interference with the ring segments 142.

Figure 5:
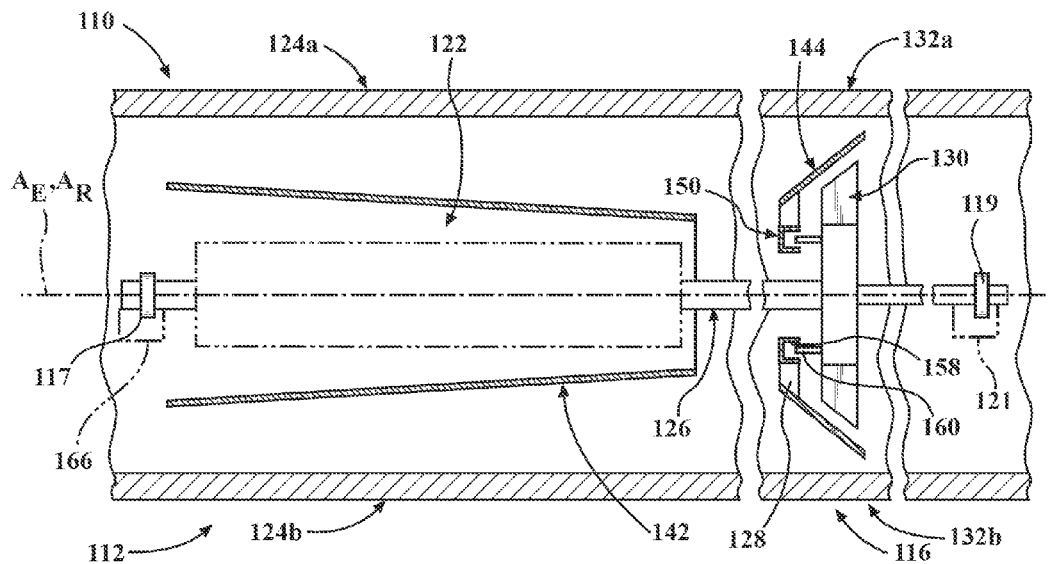

FIG. 5 illustrates completion of the assembly of the casing for the engine 110, and includes positioning an upper compressor casing 124a over the compressor blade assembly 122 and in engagement with the lower compressor casing 124b, thus enclosing the flow path through the compressor section 112.

Figure 6:
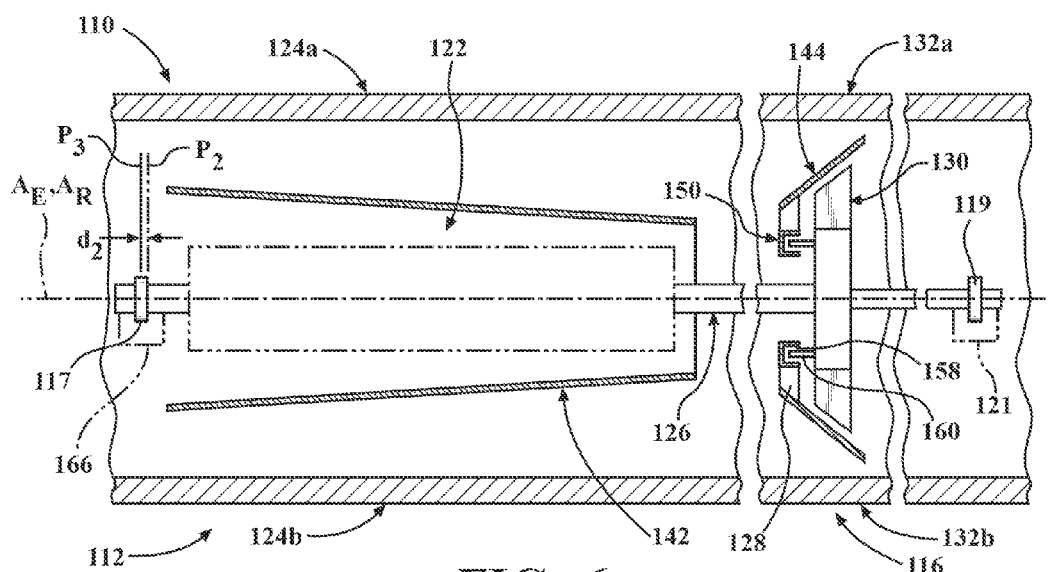
Figure 7:
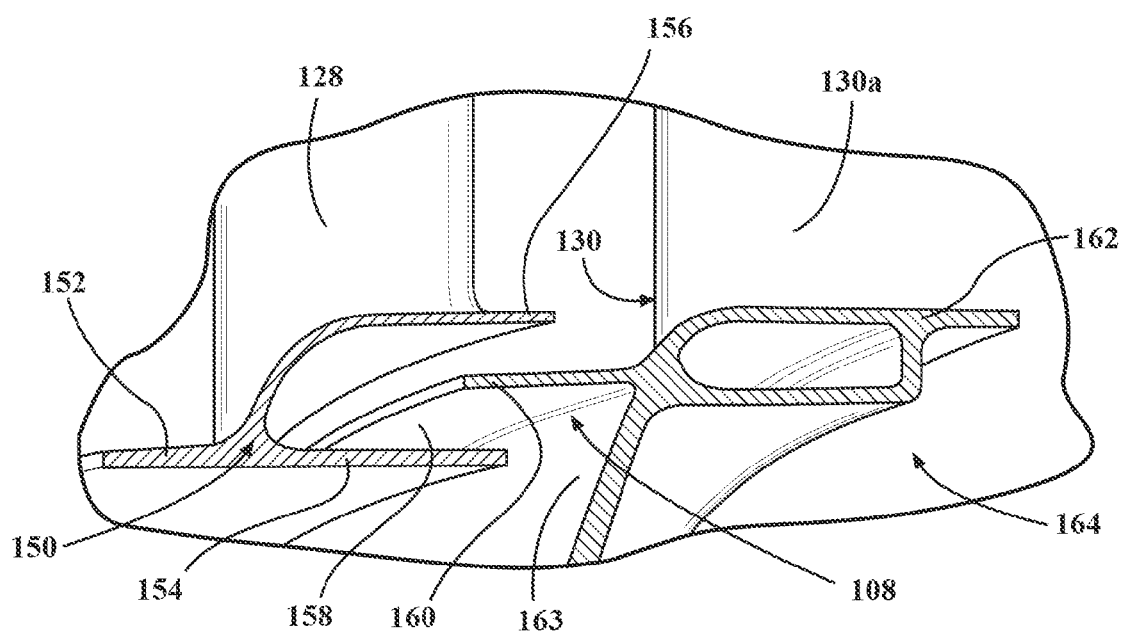
FIG. 7 is a perspective view illustrating an overlapping seal formed in accordance with aspects of the method of the present invention.

FIG. 6 illustrates an additional step in which an axial gap within the axial seal 108 is further closed and which may occur during operation of the engine 110. The additional step may comprise a hydraulic clearance optimization in which the rotor assembly 126 is shifted axially forward during operation of the engine 126 to reduce the clearance between the blade tips of the turbine blade assembly 130 and the ring segments 144 in the turbine section 116. The axial movement of the rotor assembly 126 is represented by the distance $d_2$ in FIG. 6, where line $P_2$ represents an initial axial position of a location on the rotor assembly 126, such as may correspond to an initial position of a location on the rotor assembly just prior to operation of the engine 110, and the line $P_3$ represents an axially displaced position of the rotor assembly 126. The axial movement of the rotor assembly may be accomplished by a known hydraulic actuation mechanism at the front bearing housing 166 located in the compressor section 112, such as a mechanism that is currently used to provide a hydraulic clearance optimization.

It should be noted that the angle(s) at which the surfaces defining the outer boundary of the air flow passage through the compressor section 112 converge is substantially less the angle(s) at which the surfaces defining the outer boundary of the hot gas path through the turbine section 116 diverge. Hence, although the axial movement of the rotor assembly 126 in the forward direction may increase clearance within the compressor section 112, the decrease in the clearance within the turbine section 116 is substantially greater, such that an overall increase in efficiency may be provided by the axial shift of the rotor assembly 126. Further, the axial shift illustrated in FIG. 6 provides a further efficiency by increasing the overlap of the stationary seal component 150 over the seal ring 160, and thereby reducing a clearance within the overlapping seal 108 for preventing passage of gases between hot working gases in the flow path and cooling air located radially inward from the seal 108.

Figure 2A:
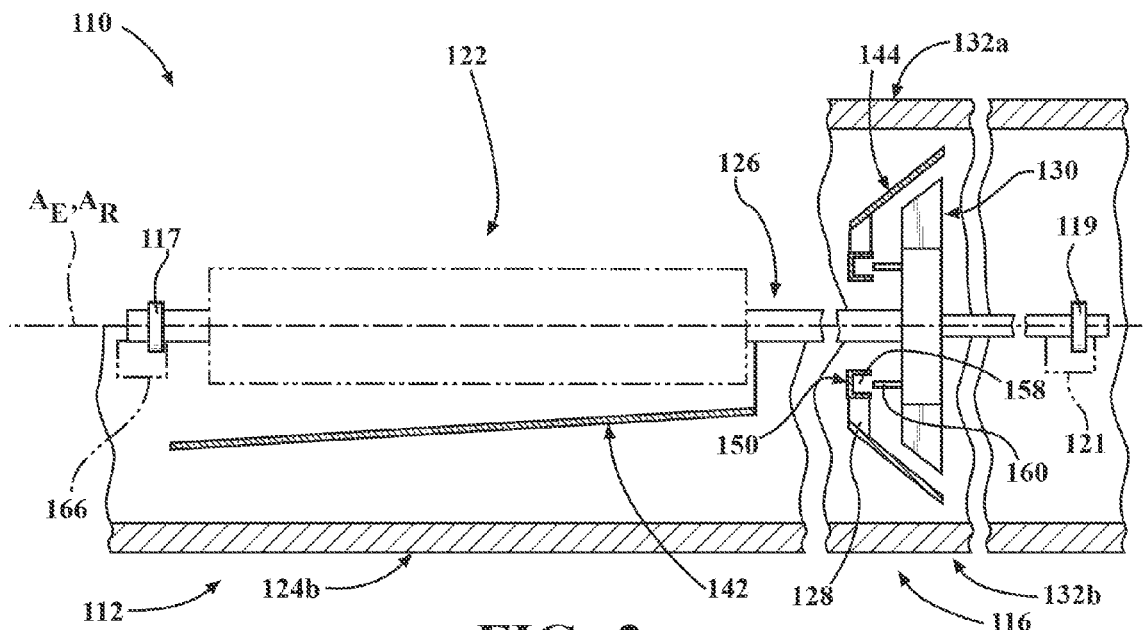
FIGS. 2a and 3a are diagrammatic illustrations showing alternative steps for the sequence of operations shown in FIGS. 1-6.
Figure 3A:
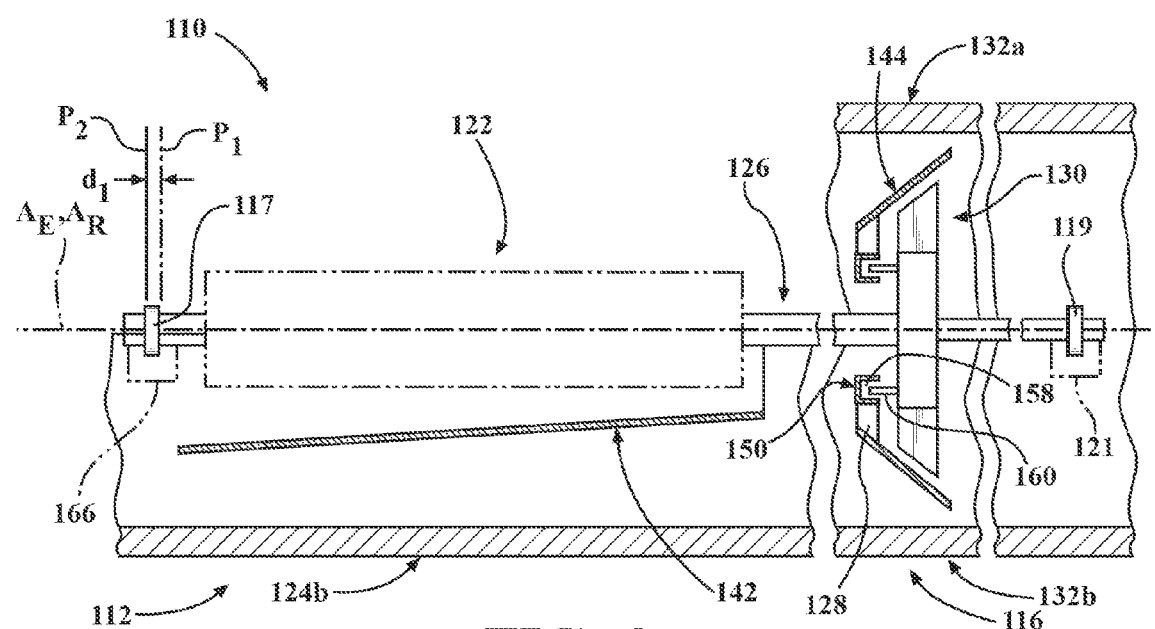
Figure 3:
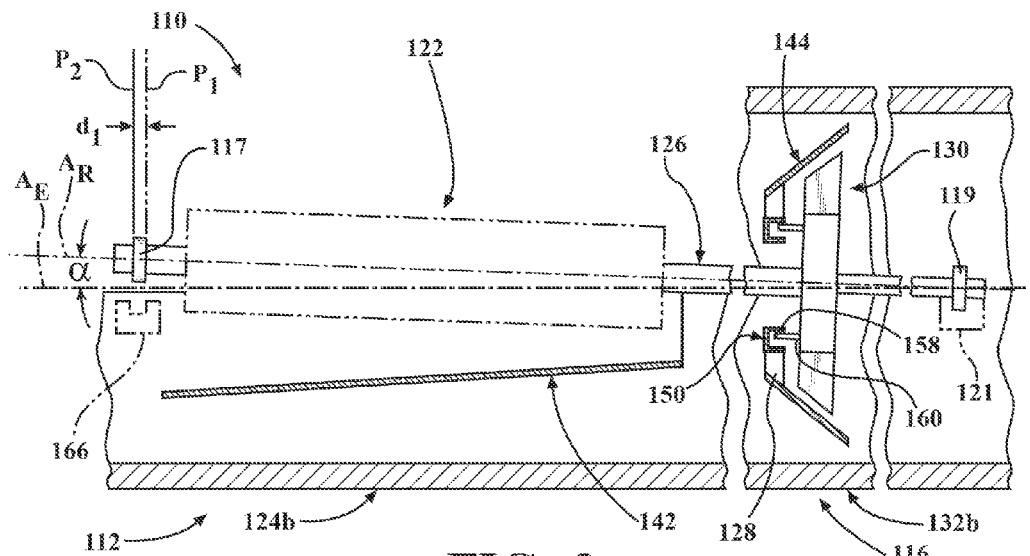

FIGS. 2a and 3a illustrate alternative steps to the method described above with reference to FIGS. 1-6. In an engine design in which a larger clearance is provided between the compressor blade assembly 122 and the seal ring 142, an assembly including the overlapping seal 108 may be provided without requiring the step of tilting the rotor assembly 126. For example, the steps described above with reference to FIGS. 1 and 2 may be replaced with the step shown in FIG. 2a, wherein the rotor assembly 126 may be lowered into the lower compressor and turbine casings 124b, 132b with the longitudinal axis $A_R$ of the rotor assembly 126 aligned with the longitudinal axis $A_E$ of the engine 110, and the upper turbine casing 132a may be assembled to the lower turbine casing 132b. Further, the steps described above with reference to FIGS. 3 and 4 may be replaced with the step shown in FIG. 3a, wherein the rotor assembly 126 may be shifted forward the distance $d_1$ following assembly of the upper turbine casing 132a to the lower turbine casing 132b, thereby positioning the ring seal 160 into an initial overlapping relation to the stationary seal component 150. The assembly of the engine may be completed in accordance with the steps described above with reference to FIGS. 5 and 6.

Further, with regard to the steps described above with reference to FIGS. 1-6, it should be understood that positioning of the rotor assembly 126 at an angle relative to the longitudinal axis $A_E$ of the engine may be provided as an initial step, rather than following an initial lowering of the rotor assembly 126. In particular, the rotor assembly 126 may be oriented at a predetermined angle and then lowered into position within the lower compressor and turbine casings 124a, 132a, to locate the rear bearing 119 in the rear bearing housing 121 with the compressor blade assembly 122 positioned at a higher elevation than the turbine blade assembly 130, as illustrated in FIG. 1.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of assembling a seal in a split plane gas turbine engine having a compressor section, a turbine section and a rotor assembly extending through said compressor section and said turbine section, said rotor assembly supporting a compressor blade assembly and a turbine blade assembly, and including a lower compressor casing and a lower turbine casing axially aligned along a horizontal longitudinal axis of said turbine engine during said assembling of said seal, said longitudinal axis defining a rotational axis of said rotor assembly during operation of said gas turbine engine, the method comprising:

i) providing a seal ring extending axially from a forward face of said turbine blade assembly;

ii) positioning said rotor assembly in association with said lower compressor casing and said lower turbine casing, said positioning including tilting said rotor assembly such that a longitudinal axis of said rotor assembly is at a predetermined angle relative to said longitudinal axis of said turbine engine and such that said compressor blade assembly is maintained at an elevated position relative to said turbine blade assembly;

iii) positioning an upper turbine casing in engagement with said lower turbine casing and over the tilted rotor assembly, said lower turbine casing and said upper turbine casing including a circumferentially extending seal groove defining an axially facing cavity for receiving said seal ring, and said seal ring having an initial non-overlapping position in relation to said seal groove;

iv) moving said rotor assembly in an axial direction toward said compressor section while maintaining said rotor assembly tilted at said predetermined angle to position said seal ring in axially overlapping relation within said seal groove; and v) further positioning said rotor assembly such that said longitudinal axis of said rotor assembly coincides with said longitudinal axis of said turbine engine, for effecting a further axial movement of an upper portion of said seal ring into said seal groove, said further positioning said rotor assembly including another tilting of said rotor assembly in which said longitudinal axis of said rotor assembly is tilted an opposite and equal amount to the tilting at the predetermined angle of step ii).

2. The method of claim 1, wherein said tilting of said rotor assembly comprises orienting said longitudinal axis of said rotor assembly at an angle greater than 0 degrees and less than 1 degree relative to said longitudinal axis of said turbine engine.

3. The method of claim 1, wherein said rotor assembly includes a front bearing adjacent to said compressor blade assembly and a rear bearing adjacent to said turbine blade assembly, and said positioning said rotor assembly comprises:
   1) lowering said rotor assembly to position said compressor blade assembly and said turbine blade assembly at a location adjacent to said lower compressor casing and said turbine casing, respectively; and
   2) lowering said rear bearing to position said rear bearing at a lower elevation than said front bearing.

4. The method of claim 1, wherein said rotor assembly includes a front bearing adjacent to said compressor blade assembly and a rear bearing adjacent to said turbine blade assembly, and said positioning said rotor assembly comprises:
   1) orienting said longitudinal axis of said rotor assembly at an angle relative to said longitudinal axis of said turbine engine with said rear bearing at a lower elevation than said front bearing; and
   2) lowering said tilted rotor assembly toward said lower compressor and turbine casings.

5. The method of claim 1, including, subsequent to positioning said longitudinal axis of said rotor assembly to coincide with said longitudinal axis of said turbine engine, positioning an upper compressor casing over said compressor blade assembly and engaged with said lower compressor casing.

6. The method of claim 1, including moving said rotor assembly axially an additional amount in the direction of said compressor section with said longitudinal axis of said rotor assembly coinciding with said longitudinal axis of said turbine engine.

7. The method of claim 6, wherein said moving said rotor assembly an additional amount occurs during operation of said turbine engine.

8. A method of assembling a seal in a split plane gas turbine engine having a compressor section, a turbine section and a rotor assembly extending through said compressor section and said turbine section, said rotor assembly supporting a compressor blade assembly and a turbine blade assembly, and including a lower compressor casing and a lower turbine casing axially aligned along a horizontal longitudinal axis of said turbine engine during said assembling of said seal, said longitudinal axis defining a rotational axis of said rotor assembly during operation of said gas turbine engine, the method comprising:
   i) providing a seal ring extending axially from a forward face of said turbine blade assembly;
   ii) positioning said rotor assembly in association with said lower compressor casing and said lower turbine casing, said positioning said rotor assembly including lowering said rotor assembly vertically into said lower compressor and turbine casings while maintaining a longitudinal axis of said rotor assembly generally horizontal;
   iii) positioning an upper turbine casing in engagement with said lower turbine casing, said lower turbine casing and said upper turbine casing including a circumferentially extending seal groove defining an axially facing cavity for receiving said seal ring, and said seal ring having an initial non-overlapping position in relation to said seal groove; and
   iv) prior to positioning an upper compressor casing into engagement with said lower compressor casing, moving said rotor assembly in an axial direction a first amount toward said compressor section to position said seal ring in axially overlapping relation within said seal groove.

9. The method of claim 8, including moving said rotor assembly axially a second amount in the direction of the compressor with a longitudinal axis of said rotor assembly coinciding with said longitudinal axis of said turbine engine.

10. The method of claim 9, including, prior to moving said rotor assembly said second amount, positioning an upper compressor casing over said compressor blade assembly and engaged with said lower compressor casing.

11. The method of claim 10, wherein said moving said rotor assembly said second amount occurs during operation of said turbine engine.

12. The method of claim 11, including, prior to said moving said rotor assembly said first amount, tilting said longitudinal axis of said rotor assembly relative to said longitudinal axis of said turbine engine to orient said rotor assembly such said compressor blade assembly is at an elevated position relative to said turbine blade assembly.

\* \* \* \* \*